(12) United States Patent
Purkeypile et al.

(10) Patent No.: US 8,407,691 B2
(45) Date of Patent: *Mar. 26, 2013

(54) USER INTERFACE FOR AUTOMATED PROVISION OF BUILD IMAGES

(75) Inventors: Matthew Purkeypile, Santa Clara, CA (US); Victor Reha, Mountain View, CA (US); Scott Patton, Morgan Hill, CA (US); Michael Lockwood, San Jose, CA (US); Jeffrey Sulm, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1436 days.

This patent is subject to a terminal disclaimer.

(21) Appl. No.: 11/700,699

(22) Filed: Jan. 30, 2007

(65) Prior Publication Data

US 2007/0174834 A1 Jul. 26, 2007

Related U.S. Application Data

(63) Continuation of application No. 10/404,522, filed on Mar. 31, 2003, now Pat. No. 7,181,740.

(51) Int. Cl.
*G06F 9/445* (2006.01)
(52) U.S. Cl. ......................................... 717/174; 717/176
(58) Field of Classification Search .................. 717/174, 717/176
See application file for complete search history.

(56) References Cited

U.S. PATENT DOCUMENTS

| | | | |
|---|---|---|---|
| 5,247,683 A | 9/1993 | Holmes et al. | |
| 5,649,200 A | 7/1997 | Leblang et al. | |
| 5,801,700 A * | 9/1998 | Ferguson | 715/748 |
| 5,850,554 A | 12/1998 | Carver | |
| 5,859,623 A * | 1/1999 | Meyn et al. | 715/730 |
| 5,931,909 A | 8/1999 | Taylor | |
| 6,327,706 B1 | 12/2001 | Amberg et al. | |
| 6,385,766 B1 | 5/2002 | Doran et al. | |
| 6,675,382 B1 | 1/2004 | Foster | |
| 6,721,946 B1 | 4/2004 | Fogarty et al. | |
| 6,854,112 B2 | 2/2005 | Crespo et al. | |
| 6,874,130 B1 * | 3/2005 | Baweja et al. | 715/805 |
| 7,240,037 B1 * | 7/2007 | Bussell | 705/75 |
| 2002/0007453 A1 * | 1/2002 | Nemovicher | 713/155 |
| 2002/0023057 A1 * | 2/2002 | Goodwin et al. | 705/50 |
| 2002/0112232 A1 * | 8/2002 | Ream et al. | 717/176 |
| 2002/0188688 A1 | 12/2002 | Bice et al. | |
| 2003/0126056 A1 * | 7/2003 | Hausman et al. | 705/36 |
| 2003/0236927 A1 | 12/2003 | Cleraux et al. | |
| 2004/0085359 A1 | 5/2004 | Steg et al. | |
| 2005/0108729 A1 * | 5/2005 | Camara et al. | 719/321 |

OTHER PUBLICATIONS

Koan et al., "It Takes s Village to build an Image", Sep. 21-24, 2003, 2003 ACM 1-58113-665-X/03/0009, pp. 200-207.

* cited by examiner

*Primary Examiner* — Anna Deng
(74) *Attorney, Agent, or Firm* — John L. Rogitz

(57) ABSTRACT

A method for automated provision of build images is disclosed. The method includes identifying the network location of build scripts that provide information regarding the installation of installation files and copying the build scripts from the location on the network to a memory, e.g., a disk drive of a target computer system. In addition, the method includes copying installation files that correspond to the build scripts to the drive of the target machine. The installation files are subsequently installed on the target machine to create the build image.

24 Claims, 28 Drawing Sheets

| SOFTWARE TITLE | SITID | VERSION | CHAMPION | BUILD INFO |
|---|---|---|---|---|
| *131* | *133* | *135* | *137* | *139* |
| America Online | | | | |
| AT&T, Online Services, AT&T Worldnet | 0224801.ATT | 6.2.2_9.5.02 | WeberN | |
| Boingo, Online Services, Boingo Wireless | 0222501.BGO | 8.13.02 | WeberN | |
| Earthlink, Online Services, Earthlink TotalAccess | 0234401.ELK | 2003.1.12.0+rev2 | WeberN | |
| Microsoft, Online Services, MSN | 0235001.MST | 8_10.04.02_sony2 | WeberN | Sony bounty code |
| Yahoo, Online Services, Get Sony Yahoo Software | 0133301.YAH | 2001.11.29.3 | WeberN | |
| Group Total: 6 | | | | |
| BOM Category: Application-Productivity | | | | |
| Adobe, Productivity, Acrobat Reader | 0230101.ADB | 5.1.0.216 | DrokovaN | Run AcroReader51_ENU_full.exe |
| Adobe, Productivity, Adobe Registry Patch | 0226301.ADB | 1.0 | DrokovaN | Fixes defect 6035 and updates regi so that change and remove buttons merge into one |
| Intuit, Productivity, Quicken 2003 | 0230101.ITU | R2 | DrokovaN | Install from the local CD-ROM drive. Quicken will not install from a network CD ROM Drive |
| Veritas, Productivity PxEngine | 03055501.VER | 2.0.384 | IgnacioA | |
| Group Total: 4 | | | | |

FIGURE 1B

| SOFTWARE TITLE ⌐131 | SITID ⌐133 | VERSION ⌐135 | CHAMPION ⌐137 | BUILD INFO ⌐139 |
|---|---|---|---|---|
| BOM Category: Applications-Marketing | | | | |
| Sony ITC, Marketing Material, Experience VAIO | 0233801.SNC | 3.6 | DrokovaN | DT Standard (revision2) |
| Sony ITC, Marketing Material, Memory Stick Icon | 0209504.SNC | 1.2.0.0-20010912 | Dimagmalin | Follow Installation! Install after in MS Drivers (Desktop) |
| Sony ITC, Marketing Material, VAIO Serenus Wallpaper | 0305501.SNC | 1.00.00.0210210-Serenus-ISS-20030108 | Demps | For all SKUs. |
| Sony ITD, Marketing Material, Bookmarks-IE | 0300901.SND | 1.9.03 | WeberN | English |
| Sony ITD, Marketing Material, Image Station Web Site | 0233703.SND | 4.03 | DrokovaN | Fixes "Start in" path for automation |
| Sony ITD, Marketing Material, VAIO Registration | 0305205.SND | 8.0.0 | KokaS | For XP Home and Professional ED |
| Sony ITD, Marketing Material, VAIO Survey Standalone | 0305509.SND | 1.50 | VupputuriS | run setup.exe/s/f1"d:\0305509.SND\s |
| Group Total: 7 | | | | |
| BOM Category: Documentation | | | | |
| Sony ITC, Reference, Driver Settings Request Page | 0235101.SNC | 0211211E | KawaguchiK | |
| Sony ITD, Reference, E-Flyer pop up utility | 0302104.SND | 1.0.0.5 | LockwoodM | E-Flyer popup utility with multi line support. Supports French, Spanish and English |
| Sony ITD, Reference, Generic eSpec | 0209505.SND | 1.0.0.0 | LockwoodM | |
| Group Total: 3 | | | | |

FIGURE 1B cont.

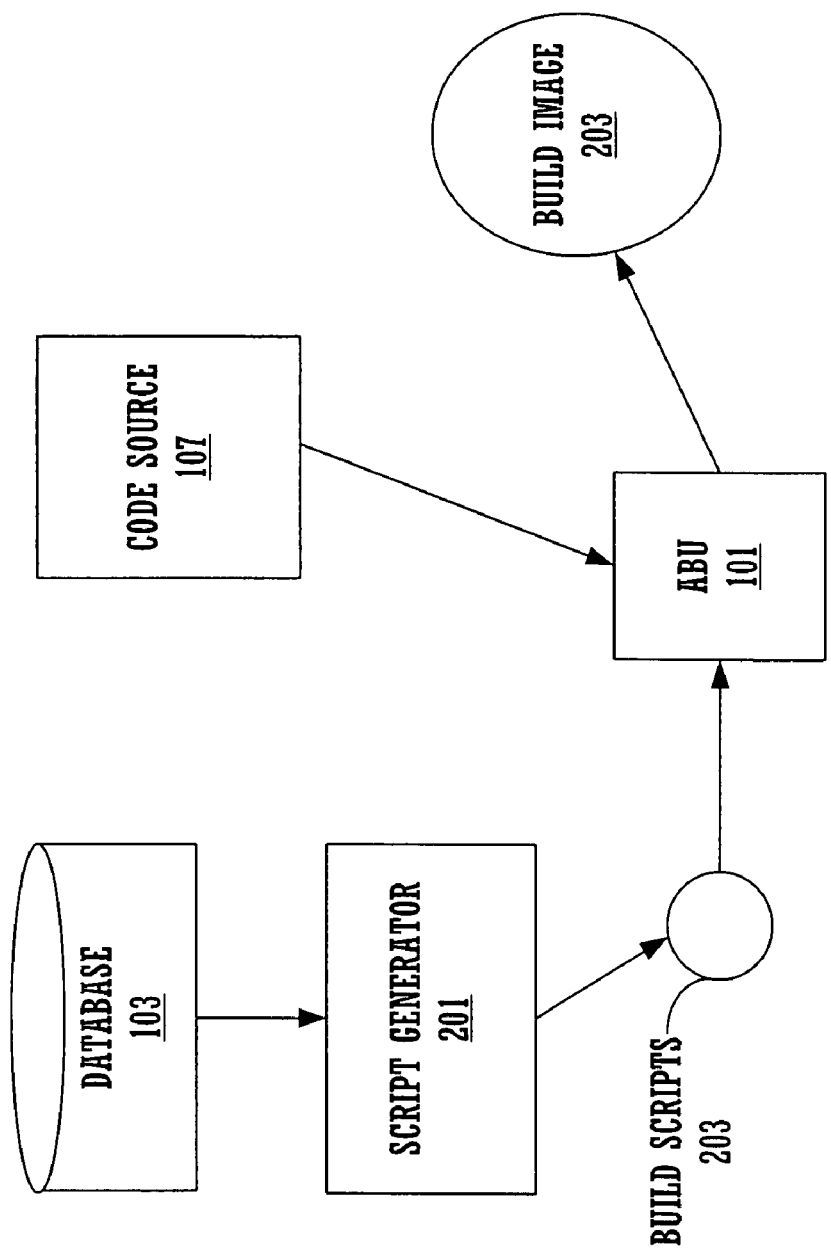

Status

- ☑ C 1    Over 137GB HDD QFE reg...
- ☑     2    CNR Modem
- ☑ C 3    3D Screensaver Registry P...
- ☑     4    SiS 651 Chipset
- ☑ ✓ 5    GigaPocket Limecard
- ☑ ✓ 6    DV Shared Library
- ☑     7    SiS 651
- ☑ ✓ 8    UI Designer Selector
- ☑ ✓ 9    Music Visualizer Library
- ☑    10    Smart Capture Library
- ☑ ✓ 11    Sony Shared Library
- ☑ C 12    ImageStation Library 301a

| Status | |
|---|---|
| ☑ C 1 | Over 137GB HDD QFE reg... |
| ☑   2 | CNR Modem |
| ☑ C 3 | 3D Screensaver Registry P... |
| ☑   4 | SiS 651 Chipset |
| ☑ ✓ 5 | GigaPocket Limecard |
| ☑ ✓ 6 | DV Shared Library |
| ☑   7 | SiS 651 |
| ☑ ✓ 8 | UI Designer Selector |
| ☑ ✓ 9 | Music Visualizer Library |
| ☑   10 | Smart Capture Library |
| ☑ ✓ 11 | Sony Shared Library |
| ☑ C 12 | ImageStation Library |

FIGURE 3E

Status

- ☑ 1 Over 137GB HDD QFE reg...
- ☐ 2 CNR Modem
- ☐ 3 3D Screensaver Registry P...
- ☐ 4 SiS 651 Chipset
- ☑ 5 GigaPocket Limecard
- ☐ 6 DV Shared Library
- ☐ 7 SiS 651
- ☑ 8 UI Designer Selector
- ☑ ■ Pause for 60 seconds(s).
- ☑ 9 Music Visualizer Library
- ☑ 10 Smart Capture Library
- ☐ 11 Sony Shared Library
- ☐ 12 ImageStation Library

FIGURE 3F

| Status | |
|---|---|
| ☐ 1 | Over 137GB HDD QFE reg... |
| ☐ 2 | CNR Modem |
| ☐ 3 | 3D Screensaver Registry P... |
| ☐ 4 | SiS 651 Chipset |
| ☐ 5 | GigaPocket Limecard |
| ☐ 6 | DV Shared Library |
| ☐ 7 | SiS 651 |
| ☐ 8 | UI Designer Selector |
| ☐ ■ | Pause for 60 seconds(s). |
| ☐ 9 | Music Visualizer Library |
| ☐ 10 | Smart Capture Library |
| ☐ 11 | Sony Shared Library |
| ☐ 12 | ImageStation Library |

FIGURE 3G

USER INTERFACE FOR AUTOMATED PROVISION OF BUILD IMAGES

RELATED APPLICATIONS

The present application is a continuation of and claims the benefit of U.S. patent application Ser. No. 10/404,522, filed Mar. 31, 2003, now U.S. Pat. No. 7,181,740 entitled "METHOD AND SYSTEM FOR AUTOMATED PROVISION OF BUILD IMAGES," naming Matthew Purkeypile, Victor Reha, Scott Patton, Michael Lockwood and Jeffrey Sulm as inventors, assigned to the assignee of the present invention. That application is incorporated herein by reference in its entirety and for all purposes.

FIELD OF THE INVENTION

The present invention relates generally to the automated installation of software programs. In particular, embodiments of the present invention relate to a method and system for automated construction of build images.

BACKGROUND OF THE INVENTION

A software image is a preinstalled computer system software package. Consumers receive commercially available versions of such packages routinely as an included feature of the computer systems that they purchase. Such software images provide the owners of such computer systems with the immediate capacity to make effective use of their computers. As a result, these systems are highly valued by consumers. Consequently, the development of ever more marketable versions of such software images is pursued by computer system manufacturers.

Conventional methods of creating software images involve the manual Installation of each software component that is included in the images. Such manual methods of creating software images are tedious and time consuming as each piece of software is manually installed on a single computer that contains the image. In addition, the images that are created may not be consistent. This is readily apparent when it is considered that different engineers are likely to install the same software program differently or that the same engineer may install the same software program differently on different systems (or on different occasions for that matter). Moreover, as with any manual process the manual installation of software is prone to errors.

A "build" is a version of a software image. A software image may undergo many iterations or "builds" during the course of its development. It should be appreciated that the different versions that are created need to be tracked so that they do not become confused. Difficulties tracking the software image versions may be compounded by the large number of programs and computer platforms that may be involved in a build. The large number of software types, build versions and computer system platforms that are involved can present challenges that are not easily managed.

The management challenges are especially apparent when considering the manual procedures used to construct the builds. It would not be uncommon for a single computer vendor to have to support some 50 or more different builds considering the different program versions involved and the different computer platforms involved. It should be appreciated that these complications present a significant challenge to the manual performance of the tasks involved in managing successive build images.

SUMMARY OF THE INVENTION

Accordingly, a need exists for a method and system for automated provision of build images. The present invention provides a method and system that accomplishes this need.

Embodiments include a system that includes a database, a server, a target machine and an automated build utility or ABU. In the database, information regarding programs, their version, identity and source installation code is provided. Also provided in the database is a script. The script informs the ABU of the programs that are to be installed on the target machine. The server contains the programs. Generally, the ABU reads a script, associated with a build, and follows the instructions in the script to install the identified programs on the target machine automatically. The ABU also contains a number of graphical user interfaces that aid an engineer in the process of automatically constructing the build. Different builds can be constructed by merely changing the contents of the script file.

According to one embodiment of the present invention a method for automated provision of build images is disclosed. The method includes identifying the network location of build scripts that provide information regarding the installation of installation files, and copying the build scripts from the location on the network to the hard drive of a target machine. In addition, the method includes copying installation files from a server where the files correspond to the build scripts. The files are copied to the hard drive of the target machine. In one implementation a magnetic hard drive is used but an optical drive could also be used. The installation files are subsequently installed on the target machine to create the build image.

According to one embodiment, an automated build utility (ABU) is disclosed. The ABU includes a processor, a memory device that includes computer executable instructions stored therein for performing a method for providing an automated build image including identifying the network location of build scripts that provide information regarding the installation of installation files and copying the build scripts from the location on the network to the drive of a target machine. In addition, the method includes copying installation files that correspond to said build scripts to the drive of said target machine. The installation files are subsequently installed on the target machine to create the build image.

In still another embodiment, a network is disclosed. The network includes a server, a database, a target machine and an automated build utility (ABU). According to this embodiment the ABU copies build scripts obtained from the database, and installation files obtained from the server; to the drive of the target machine, and automatically creates a build image.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1B shows a section of an exemplary BOM that is configured according to one embodiment of the invention.

FIG. 2 is a functional block diagram of an exemplary image build system according to one embodiment of the present invention.

FIG. 3B shows a GUI status list area window, such as is shown in FIG. 3A, that displays a representation of its contents at a point during a build process performed in accordance with one embodiment of the present invention.

FIG. 3E illustrates the operation of the "Mark Items" feature according to one embodiment of the present invention.

FIG. 3F illustrates the operation of the "Mark Items" ABU feature according to one embodiment of the present invention.

FIG. 3G illustrates the operation of the "Toggle Items" ABU feature according to one embodiment of the present invention.

FIG. 3O shows a graphical illustration of a tools menu window configured according to one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in logic blocks or other symbolic representations of operations on data bits within a computer system or electronic computing device. These descriptions and representations are the means used by those skilled in the data processing arts to most effectively convey the substance of their work to others skilled in the art. A logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "identifying" or "copying" or the like, refer to the action and processes of an electronic computing device that manipulates and transforms data.

Exemplary Network in Accordance with Embodiments of the Invention

Figure 1A:
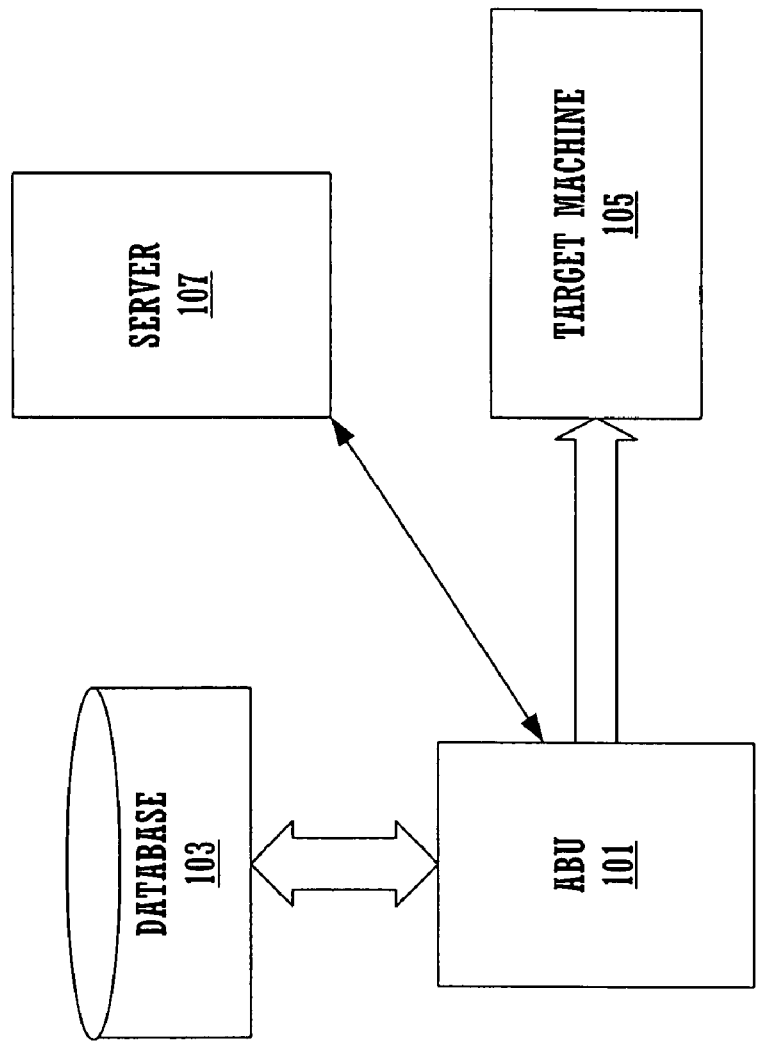
FIG. 1A shows a block diagram of an automated build utility (ABU) network according to one embodiment of the present invention.

FIG. 1A shows a block diagram of an automated build utility (ABU) network 100 according to one embodiment of the present invention. The ABU network encompasses an automated software installation infrastructure that features a software installation methodology that may be applied repetitively in the installation of new program versions or "builds". FIG. 1A shows ABU 101, database 103, target machine (e.g., personal computer) 105 and network server 107.

Automated build utility unit (ABU) 101 facilitates the rapid creation of builds by automating the installation and configuration tasks that are performed in the creation of a build. A build is a digital image representing one or more installed programs on the target machine. The build can exist on an optical or magnetic hard drive or can also reside in any computer readable medium such as RAM or ROM, etc. According to one embodiment, the ABU 101 collects program components from the network server 107 and configures them according to specifications that are obtained from a database (e.g., 103). Unless modified, the same process that is employed in the creating of one program build is employed in the building of subsequent program builds. A consonant build process that is executed each time a build is created is thereby assured. Once the build is created for a particular target platform, it can be easily copied onto each computer product, e.g., for sale.

Database 103 contains build scripts that direct software installation. Each script can control the generation of a respective build. The build scripts direct the selection and configuration of program components that are to be employed in the creation of the build. Information provided by the build scripts may include but is not limited to software identification information, server path, program specific installation instructions, special installation instructions for individual programs, special installation instructions for the build being created, registry information, version number, etc. A separate script, and separate build can be provided for each computer platform on which software is to be installed. Also, separate scripts can be used for separate software versions of the installed software.

The software image (e.g., "build image") to be installed may be described in a bill of materials (BOM). FIG. 1B shows a section of an exemplary BOM that is configured according to one embodiment of the invention. The script related to the BOM will contain identifications of the software outlined in the BOM and an installation order thereof. The fields of the BOM may include but are not limited to software title 131, SITD 133, version 135, champion 137 (engineer) and build information 139 (see FIG. 1B). It should be appreciated that the build information 139 includes installation details related to the version 135 of the software title 131 that is listed in the BOM 120. The engineer 137 may use this information when creating the script for the build image. This information represents a type of data that may be stored in database 103.

Network server 107 stores the code for the software programs that may be installed by the ABU. The network server also stores the operating system (e.g., windows etc.) and program drivers that are necessary to operate software program. These components together form a software image.

The target machine (e.g., VAIO PC etc.) 105 is the target personal computer the software is to be installed on, although any computer system may be used. The ABU 101 installs software that resides in the database 103 onto this machine. Build scripts that are obtained from the database 103 provide the ABU with a blueprint to the installation of the latest versions of the software components of a software build image.

FIG. 2 is a functional block diagram 200 of an exemplary image build system according to one embodiment of the present invention. FIG. 2 shows ABU 101, database 103, script generator 201, build scripts 203, code source 107, and build image 207.

Referring to FIG. 2, ABU 101 automatically obtains software code from code source 107 (e.g., server 107 etc.). The ABU also automatically obtains build scripts 203 from database 103 that correspond to the software obtained from the code source. The build scripts 203 provide a blueprint that directs the configuration and installation by the ABU 101 of the software images 207 that comprise a build. The latest revision of the software is installed on a target machine (e.g., PC 105) according to the ABU 101.

Graphical User Interface

Figure 3A:
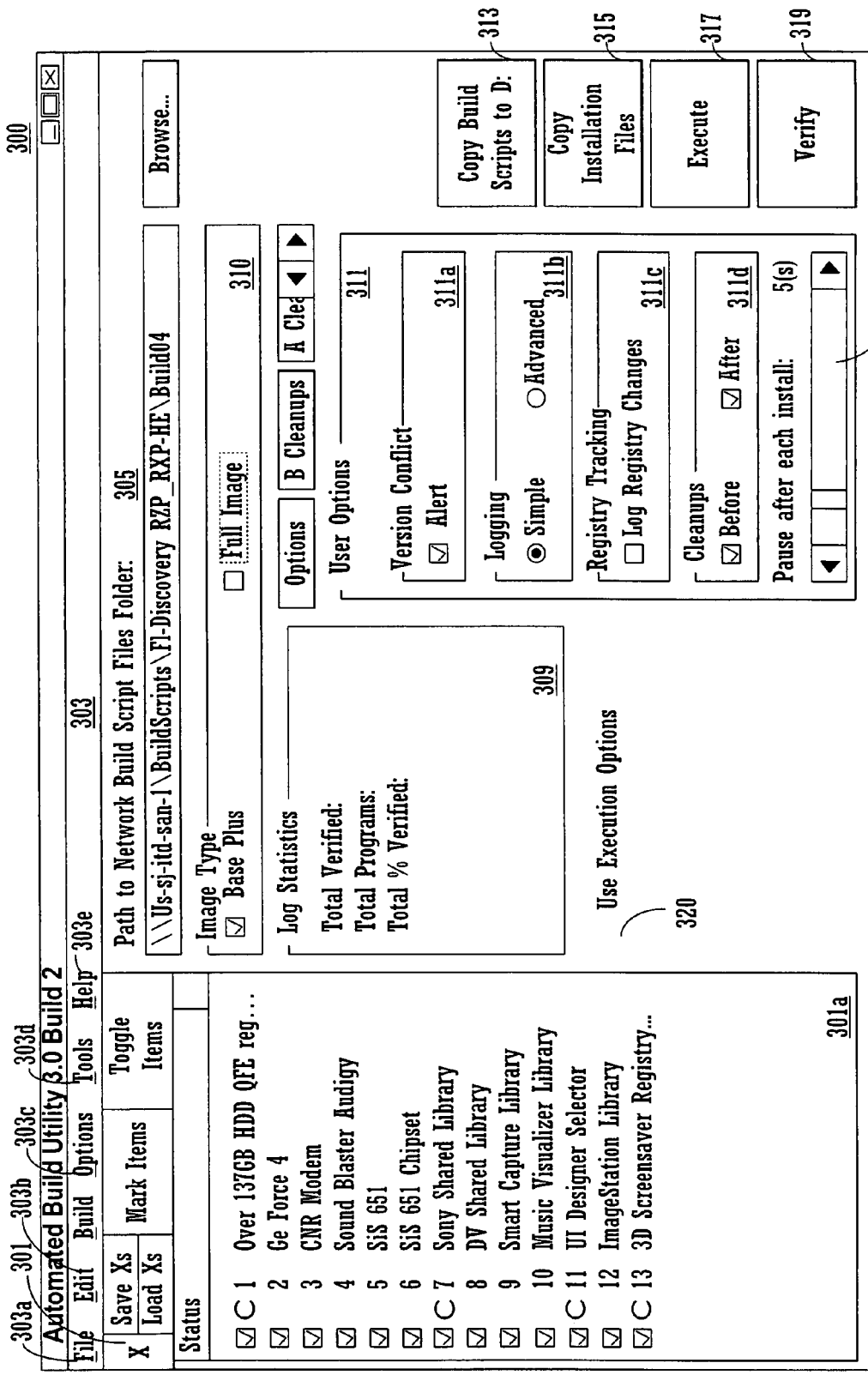
FIG. 3A shows a graphical user interface (GUI) with a layout configured according to one embodiment of the present invention.

FIG. 3A shows a graphical user interface (GUI) 300 with a layout configured according to one embodiment of the present invention. The GUI 300 facilitates user control of the ABU's automated build creating operations by accommodating user inputs. In addition the GUI 300 displays useful information about these operations and facilitates their customization. It should be appreciated that the GUI 300 may provide windows that display a listing of the installation files (e.g., operating systems, software, drivers etc.) that have been identified for use in a particular build along with an indication of the statuses of the identified installation files. Moreover, the GUI 300 may include a series of graphically rendered button functions whose activations trigger the execution of the ABU's aforementioned automated software installation operations. FIG. 3A shows tool bar 303, path to network build script files folder display 305, status area toolbar 301, log statistics display 309, image type select 310, user options window 311, copy build scripts button function 313, copy installation files button function 315, execute button function 317, and verify button function 319.

Installation File Selection/Status

Installation file status window 301A lists and provides an indication of the status of items (e.g., installation files) that have been identified for copying from the network (e.g., network server 107). The items listed are the programs that may be installed in the creation of an image build and are defined by the script shown as 305. Status area toolbar 301 facilitates the selection of the items that are listed in the installation file status window 301 A. As the ABU installs the programs identified in 301 A, their respective status is updated. Status indicates if an installation was completed or if an error was encountered. It should be appreciated that some or all of the items listed in the window may be selected.

According to one embodiment, a custom copy installation function may be provided. By employing this function user specified files selected from among the items listed in the installation file status window 301 A may be copied to the local hard disk. According to this embodiment, installation files may in this manner be copied to hard disk before their installation may be executed through the operation of the ABU.

Figure 3C:
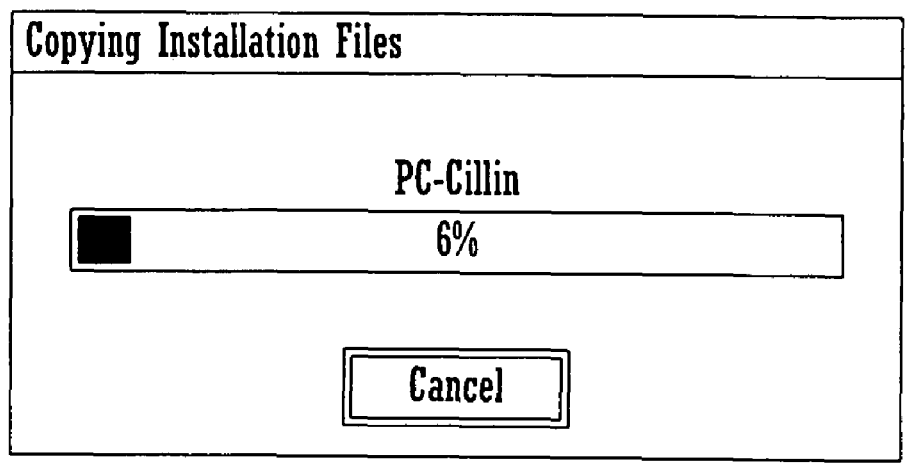
FIG. 3C shows a window that tracks a copying process by presenting a graphical representation of its progress according to one embodiment of the present invention.

FIG. 3B shows a GUI status list area window 301 A, such as is shown in FIG. 3A, which displays a representation of its contents at a point during a build process performed in accordance with one embodiment of the present invention. As is shown in FIG. 3B the status list area window may display a listing of the installation files and an indication of their existing status in the file installation process. Referring to FIG. 3B, the designations "C", "V", and "3" indicate respectively that installation files have been copied but not executed, not verified and verified. FIG. 3C shows a window that tracks the aforementioned copying process by presenting a graphical representation of the overall progress of the process.

Figure 3D:
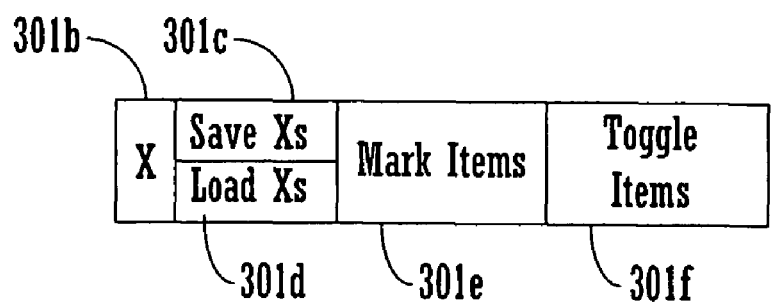
FIG. 3D is a diagram of the status area toolbar according to one embodiment of the present.

FIG. 3D is a diagram of the status area toolbar 301 according to one embodiment of the present invention. FIG. 3D shows "X" button function 301B, "Save Xs" button function 301C, "Load Xs" button function 301D, "Mark Items" button function 301E and "Toggle Items" button function 301F. According to one embodiment, the selection of the "X" button function 301B toggles all the check boxes "on" or "off". Selecting the "Save Xs" button function 301C saves all checkmarks to memory where they may be recalled by a selection of the "Load Xs" button function 301D. It should be appreciated that these checkmarks may be saved until the "Load Xs" button function 301D is selected or until the program is exited. According to one embodiment, this may be the only program operation that will clear the memory of the checkmarks saved using this feature.

According to one embodiment, while the "Load Xs" button function 301D recalls the checkmarks that have been saved into memory by the "Save Xs" 301C feature, selecting the "Mark Items" button function 301E identifies each selected item with a checkmark. It should be appreciated that multiple items can be selected in one of two ways: (1) by left clicking (e.g., as with a mouse) an item and then while holding the shift key, left clicking another item; or (2) by holding down the Ctrl key (e.g., of a keyboard) while left clicking each item. The "Toggle Items" button function 301F toggles the checkmarks of all items selected "on" or "off" depending on the checkmarks previous state ("on" or "off").

According to one embodiment, the installation file status window 301A can display up to twenty items (e.g., installation files) at a time for instance. However, more than twenty items can be accommodated by a vertical slider bar that automatically becomes available. According to one embodiment, each item may possess an associated check box. The check boxes allow a system user to distinguish items that are of interest. It should be appreciated that ABU operations such as the copying, installation execution and verification of installation files rely on the checkmarks to identify the particular installation files that are of interest when an installation operation (e.g., copying, execution, verification etc.) is being customized. As a result, items selected for copying, execution and verification may be processed as usual unless distinguished by a check mark.

According to one embodiment, each item listed in the installation file status window 301A may be denoted with an associated number. When the status list displays only "base plus" items (e.g., a default listing of items), the numbers that denote the items relate directly to numbers taken from the build scripts that are associated with the items. This also applies when the list only displays "full image" items (e.g., a complete listing of items that when installed constitute an image). It should be appreciated, however, that when both "base plus" and "full image" items are displayed in the list area the "base plus" items may be numbered prior to the numbering of the full image items, according to one embodiment of the present invention.

FIG. 3E illustrates the operation of the "Mark Items" 301E feature according to one embodiment of the present invention. This operation may be controlled by manipulating the "Mark Items" button function 301E shown in FIG. 3D. In FIG. 3E all of the items that have been selected to undergo an installation operation are distinguished by means of a checkmark (see discussion above). As is shown, icons such as "V", "C", "3" etc. may be used to represent the various program status stages as was discussed above.

FIG. 3F illustrates the operation of the "Mark Items" 301E ABU feature according to one embodiment of the present invention. This operation may be controlled through the manipulation of the "Mark Items" button function 301E shown in FIG. 3D. In FIG. 3F as in FIG. 3E, all of the items that are selected to undergo an installation operation are distinguished by means of a checkmark. However, in FIG. 3F only some of the installation files listed are selected for installation. This indicates that the build image that will be produced from an installation of the selected files may not be a full image. FIG. 3G illustrates the operation of the "Toggle Items" 301F ABU feature according to one embodiment of the present invention. This operation may be controlled through the manipulation of the "Toggle Items" button function 301F shown in FIG. 3D. As is shown in FIG. 3G, through the actual manipulation of the "Toggle Items" button function 301F all of the checkmarks that previously distinguished the selected items shown in FIG. 3F have been removed.

Copy Build Scripts to D Button Function

Copy build scripts to D button function 313 (see FIG. 3A) is a graphically rendered button function (e.g., icon) whose activation triggers the copying of build scripts that are provided by the database. Upon its activation the build scripts may be copied to the installation drive of a target machine e.g., the "D" drive in this example however any drive could be used. The build scripts provide a blueprint from which a build may be created by the ABU (e.g., 101).

Copy Installation Files Button Function

Copy installation files button function 315 (see FIG. 3A) is a graphically rendered button function (e.g., icon) whose selection triggers the copying of installation files. The installation files that are copied are taken from installation files that are listed in the installation file status window. The installation files are selected based on the image build that is being created. As previously discussed the selected files may represent "base plus" or "full image" files or both.

Execute Installation Button Function

Execute installation button function 317 (FIG. 3A) is a graphically rendered button (e.g., icon) whose selection triggers the installation of the installation files that have been copied. According to one embodiment, the installation files are installed onto a target machine (e.g., PC etc.) that is designated by the ABU. In one embodiment, the installation of the installation files onto the target machine completes the build creating process if verification of the installed installation files (e.g., software, drivers etc.) is not otherwise warranted.

Figure 3H:
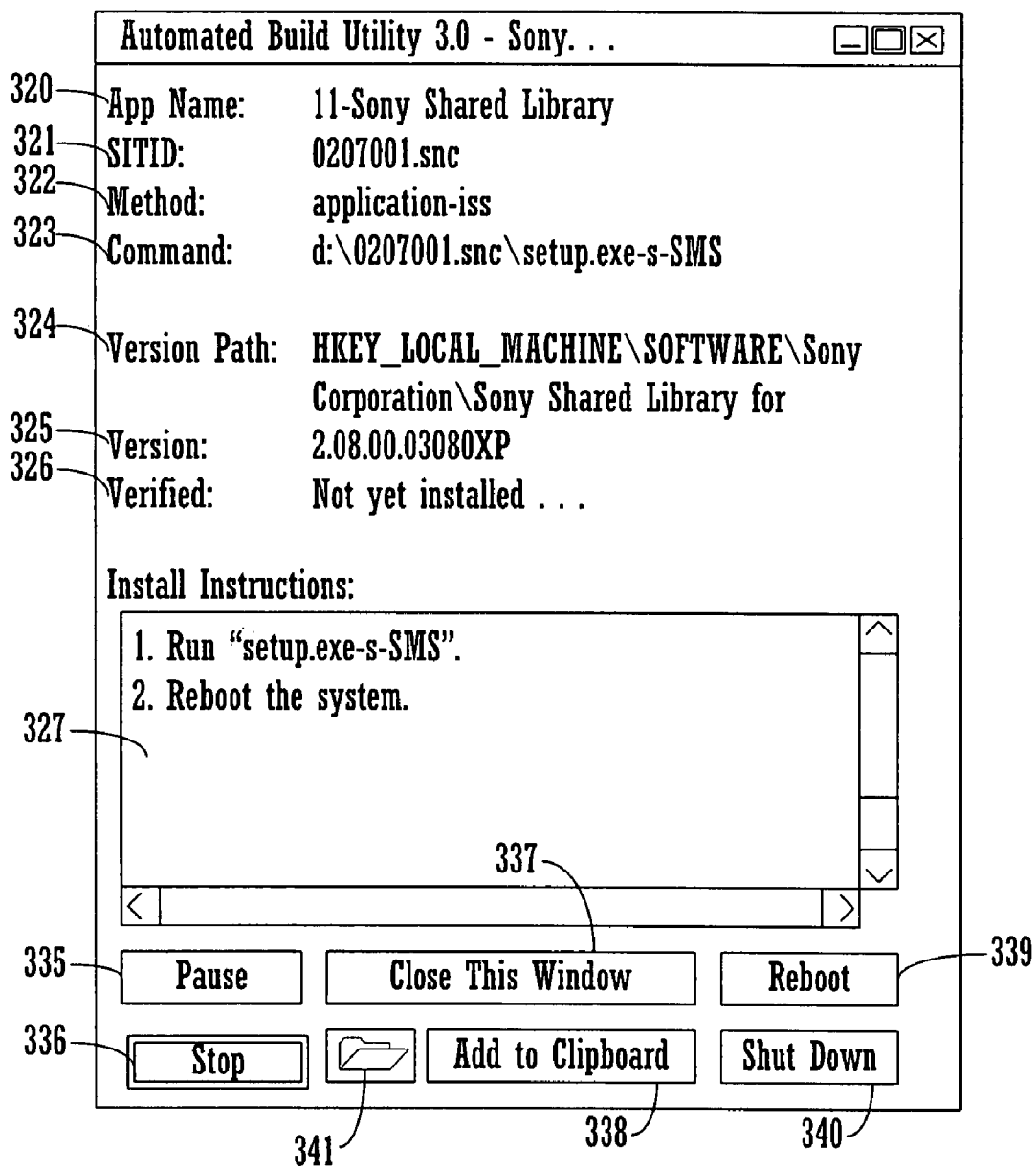
FIG. 3H shows a display that presents data related to the execution of file installation processes according to one embodiment of the present invention.

FIG. 3H shows a display 300H that presents data related to the execution of file installation processes described herein according to one embodiment of the present invention. As is shown in FIG. 3H, information displayed includes but is not limited to the application name 320, version 321, method 322, command 323, version path 324, version 325, verified, 326 and installment instructions 327 (see FIG. 3H for data displayed in one embodiment). According to one embodiment, the display facilitates the copying of specific script information to an internal clipboard for later addition to a cleanup script (see FIG. 6A-6C and accompanying discussion of cleanup scripts). It should be appreciated that script having associated manual instructions which cannot be executed by the ABU 101 can first be copied to an internal clipboard (see FIG. 3H) and be thereafter accessible from the internal clipboard through the cleanup macro option (see discussion of FIG. 3N below) from the options menu 303D. It should be noted that the folder icon 341 shown to the left of the "Add to Clipboard" button function 338 (see FIG. 3H) opens the source folder used by the ABU (e.g., 101) to install applications. Other functions accommodated by display 300H are shown in FIG. 3H (e.g., stop 336, pause 335, close this window 337, reboot 339, and shut down 340 etc.) according to one embodiment of the present invention.

Figure 3I:
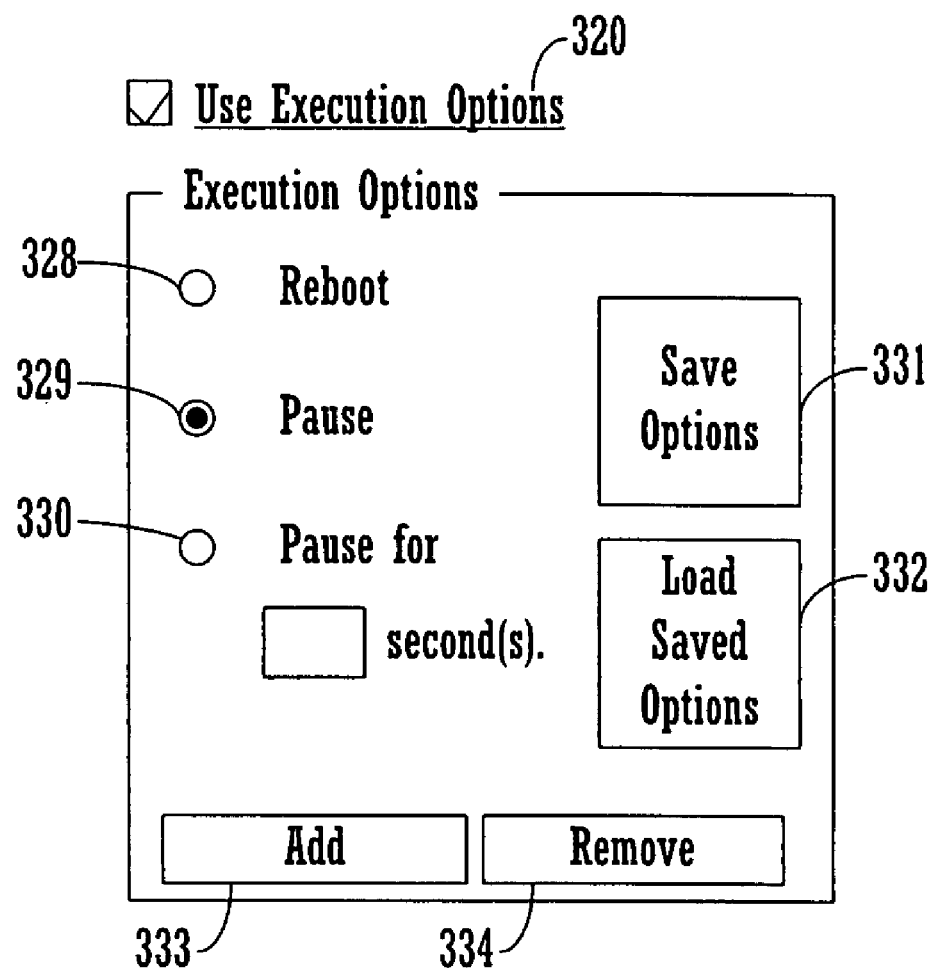
FIG. 3I shows an execution options window according to one embodiment of the present invention.

FIG. 3I shows the execution options window 320 according to one embodiment of the present invention. The execution options window 320 may be made available by checking the "Use Execution Options" box (see FIG. 3I) located in the options window (located on toolbar 303) and the options are relevant to a program that is highlighted in window 301 A. That is, during the execution of the selected programs installation, one or more execution options can be performed according to this GUI. As the name suggests, execution options only apply to program execution after the execute button function 317 has been selected. The execution options do not affect any other action. As is shown in FIG. 3I, the execution options available through this menu (e.g., 320) include but are not limited to "Reboot" 328, "Pause" 329 and "Pause for" (e.g., pause for an amount of time) 330. This function allows reboots, pauses until continue, and timed pauses to be scheduled into the actual build execution as associated with the highlighted program. Other functions available through this menu include but are not limited to "Save Options" 331, "Load Saved options 332", "Add" 333 and "Remove" 334 (see FIG. 3I structure 320).

It should be appreciated that in one embodiment adding and removing execution options is done in memory and may not be saved to disk therefore none of the options will exist when the program exits. However, by selecting the "Save Options" button (see FIG. 3I) function 331 execution options may be saved to disk. Moreover, they may be uploaded from the disk when the "Load Saved Options" button function 332 (see FIG. 3I) is selected.

According to one embodiment of the present invention, scheduled pauses may be added to the build script. It should be appreciated that the user may set the pause time. According to one embodiment, this item may then be added to an integrated status area GUI (see FIG. 3G). Although the addition of pauses may be made available as a cleanup operation (see discussion accompanying FIG. 6) these pauses, according to exemplary embodiments, may be limited to before or after executions.

It should be appreciated that an execution option (e.g., pause etc.) may be added by first selecting an item in the installation file status window 301A and by next selecting the "Add" button function 333 (see FIG. 3I). The execution option (e.g., pause etc.) will thereafter be placed ahead of the selected item in the installation file status window (see FIG. 3G solid square). According to one embodiment, execution options may be added one at a time. An item may be deleted by first selecting an item in the installation file window and next selecting the "Remove" button function 334 (see FIG. 3I). Other execution options available include time pauses scheduled for execution during builds and reboots scheduled for execution during builds (see FIG. 3I).

Verify Installation Button Function

Verify installation button function 319 (FIG. 3A) is a graphical button function whose activation triggers the ABU 101 verification of a program that has been installed. Version verification can be an important operation in the tracking of software that has already been installed. According to one embodiment, the ABU 101 may provide this function. It should be appreciated that both successful and failed version verification events may be logged. However, according to one embodiment, extensive pattern matching and error checking may be provided by the ABU as a means of ensuring successful version verification. It should be appreciated that the type of version information that may be employed to effect version verification may encompass a wide range of data. This data may include but is not limited to executable, registry key, registry value, date, and text.

Figure 3J:
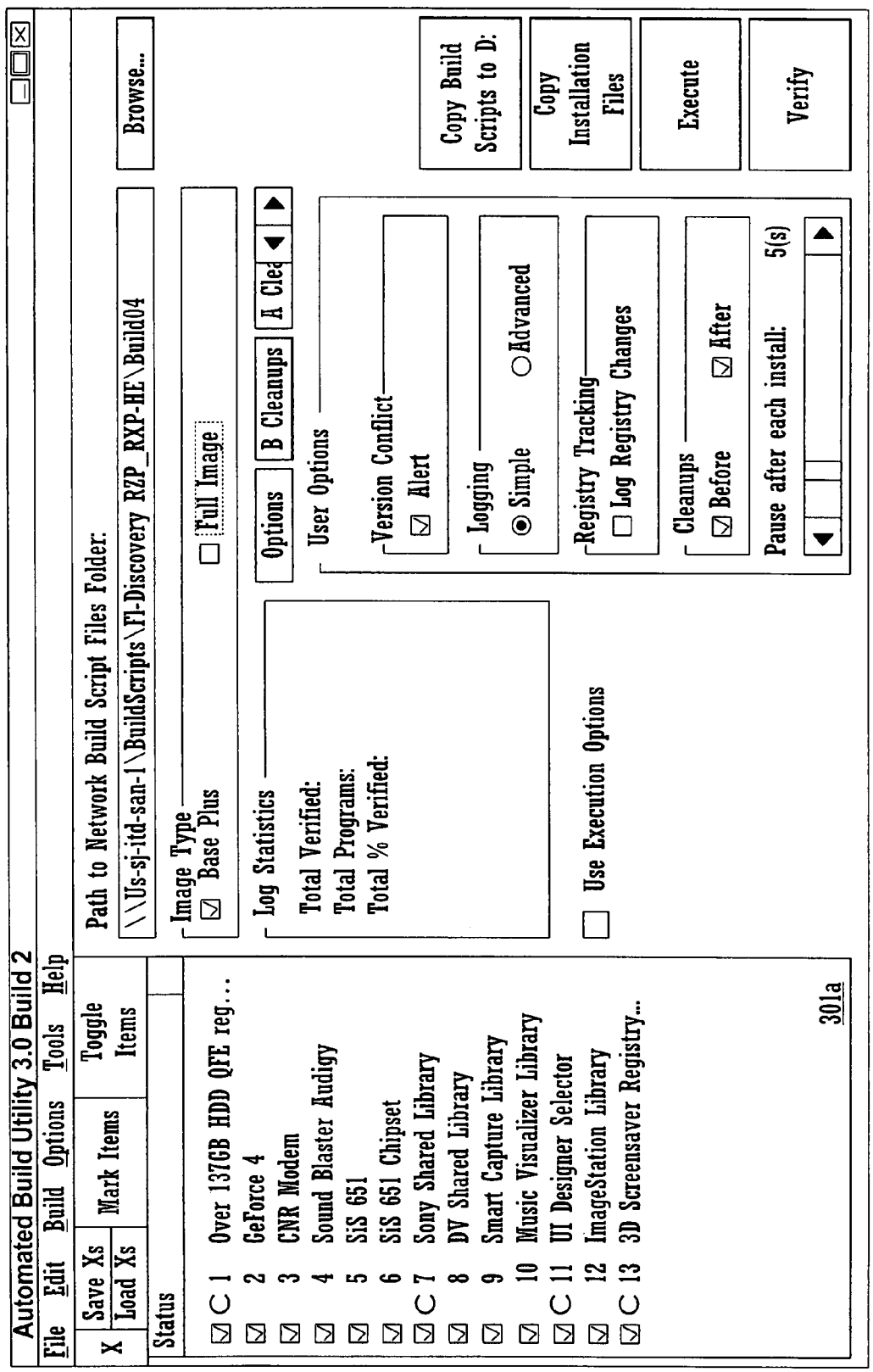
FIG. 3J shows a GUI such as is shown in FIG. 3A including installation file status window which displays a listing of the identified installation files and an indication of their existing statuses in the file installation process according to one embodiment of the present invention.
Figure 3K:
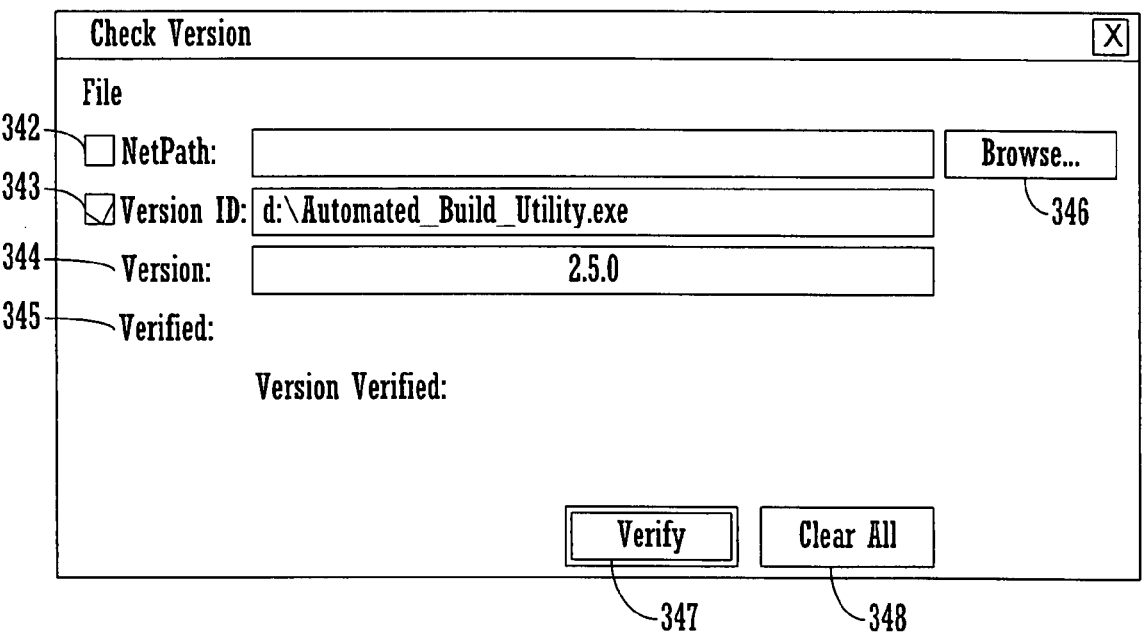
FIG. 3K shows a GUI for a "Check Version" tool that facilitates custom version checking according to one embodiment of the present invention.

FIG. 3J shows a GUI such as is shown in FIG. 3A including installation file status window 301A which displays a listing of the identified installation files and an indication of their existing status in the file installation process. It should be appreciated that a checkmark indicates that an item has been verified while a "V" indicates that the item could not be verified. Moreover, the items that are distinguished by a black "C" have been copied to the local disk but have not been executed while items not distinguished by any status icon at all have not been copied to the local disk. FIG. 3K shows a GUI for a "Check Version" tool 300K that facilitates custom version checking according to one embodiment of the present invention. The GUI may include fields for network path 342, version ID 343, Version 344 and Verified 345. Button functions may include "Verify" 347, "Browse" 346 and "Clear All" 348.

Other GUI Features

Log statistics display window 309 (see FIG. 3A) displays statistics that are compiled by operation of a program log. The underlying log program keeps track of the total number of programs, the total number of programs verified and the percentage of the total number of programs that are verified. In addition, all program executions, registry changes, and version verification results are logged. During custom executions only those items that were actually executed are logged. The logging operations themselves are split between two main log files: (1) the build log file; and the (2) program log file.

The build log file is a master log file containing all of the items that are logged while the program log file may contain as many entries as there are sections in the build script(s). It should be appreciated that the program log file is a persistent storage version of the installation file status window 301A. According to one embodiment, programs that have previously failed version verification because they have not been executed may have their status verified in the program log if they are late executed and verified. It should be appreciated that unlike the build log, in the program log, entries may only be entered for each section of build script.

The path to network build script files folder display 305 (see FIG. 3A) displays a description of the path to the network address where the file folder is located that contains the build scripts for an installation file identified for installation. The information shown in the display describes the specific location of the file folder that contains the build scripts.

Figure 3L:
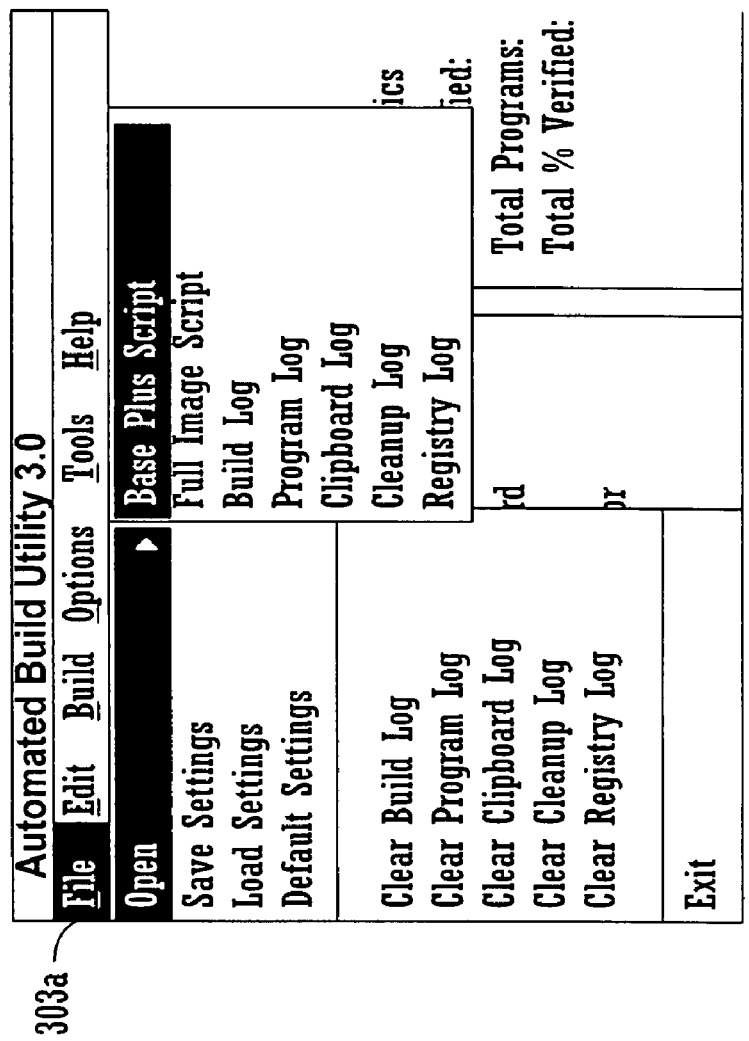
FIG. 3L is a graphical illustration of a file menu window configured according to one embodiment of the present invention.
Figure 3M:
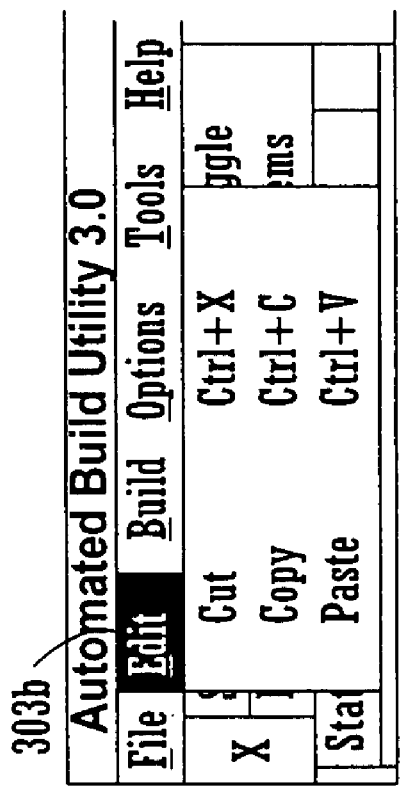
FIG. 3M is a graphical illustration of one embodiment of an edit menu window according to one embodiment of the present invention.

Toolbar 303 (see FIG. 3A) includes file 303A, edit 303B, build 303C, options 303D, tools 303E, and help menus 303F. FIG. 3L is a graphical illustration of a file menu 303A window configured according to one embodiment of the present invention. One embodiment of the present invention includes a file menu 303A that features a file/open select function. This allows commonly referred to scripts to be opened directly from the ABU. Other exemplary functions are shown in the menu depicted in FIG. 3L. However those shown are only exemplary and the actual menu may include but is not limited to the functions shown. FIG. 3M is a graphical illustration of one embodiment of an edit menu window according to one embodiment of the present invention. This menu may include but is not limited to cut, copy, and paste editing functions.

Figure 3N:
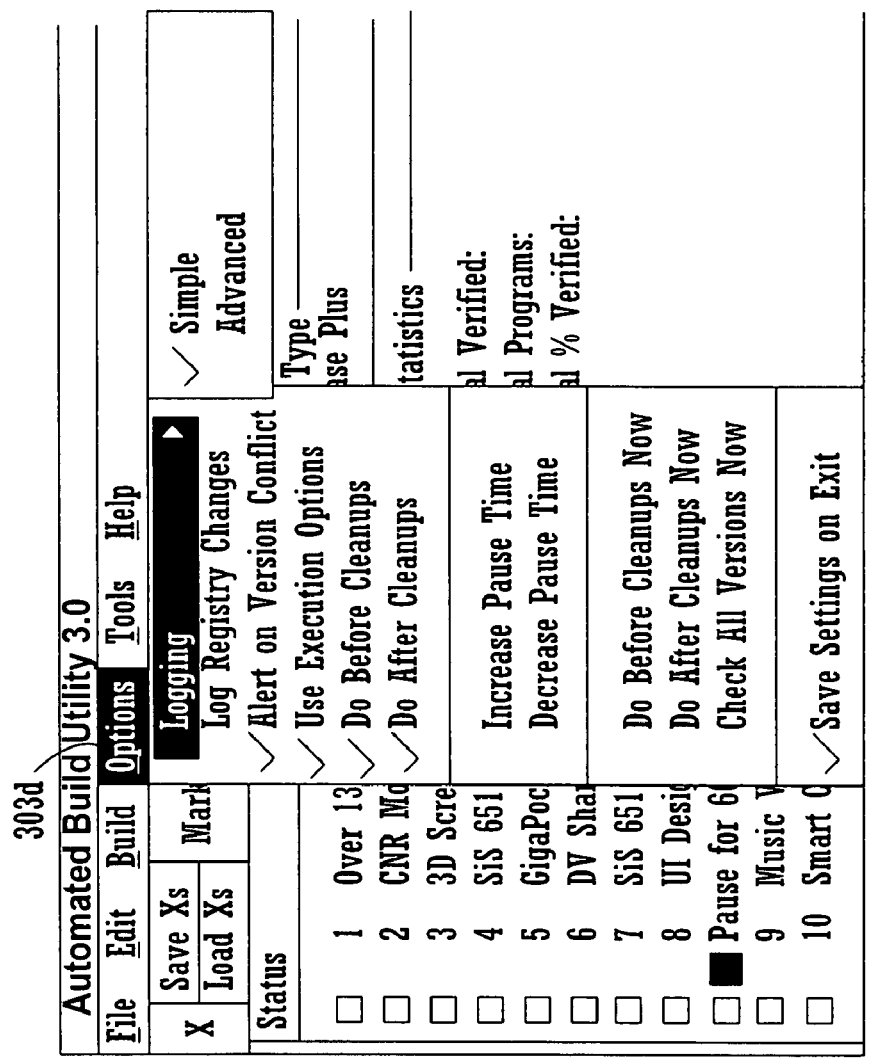
FIG. 3N is a graphical illustration of an options menu window configured according to one embodiment of the present invention.
Figure 30:
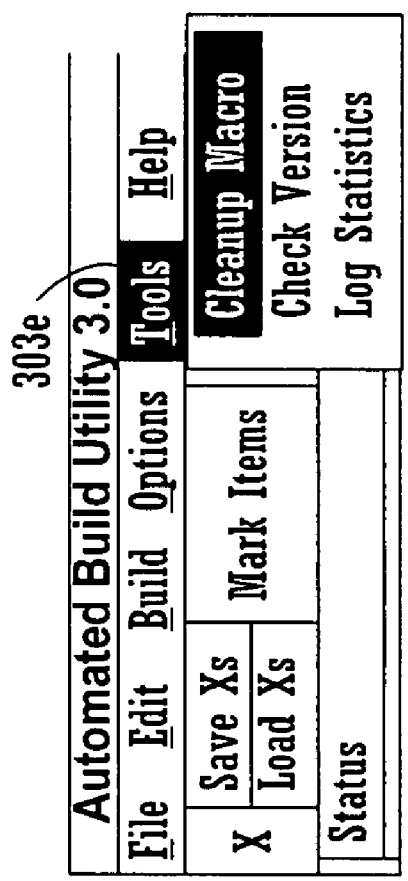

FIG. 3N is a graphical illustration of an options menu 303D window configured according to one embodiment of the present invention. One embodiment of the present invention includes but is not limited to an options menu 303D that lists such system functions as "logging" (e.g., simple and advanced), "log registry changes", "alert on version conflict", "use execution options", "do before cleanups", "do after cleanups", "increase pause time", "decrease pause time", "do before cleanups now", "do after cleanups now", "check all versions now" and "save settings on exit" (see options menu 303D listings in FIG. 3N).

FIG. 3O shows a graphical illustration of a tools menu 303E window configured according to one embodiment of the present invention. The tools menu 303E allows access to such system functions as "Cleanup Macro", "Check Version" and "Log Statistics". "Cleanup Macro" provides an interface (not shown) that accommodates the entry of information that directs the creating and editing of cleanups. "Check Version" is a stand alone program used to verify program installation. Because of the stand alone nature of the program, actions performed through "Check Version" program do not affect ABU processes. It should be appreciated that the same verification results may be displayed by both the ABU and the "Check Version" program as they both use the same underlying version verification code. Log statistics provide access to a display that presents verification statistics taken from a log file.

Figure 3P:
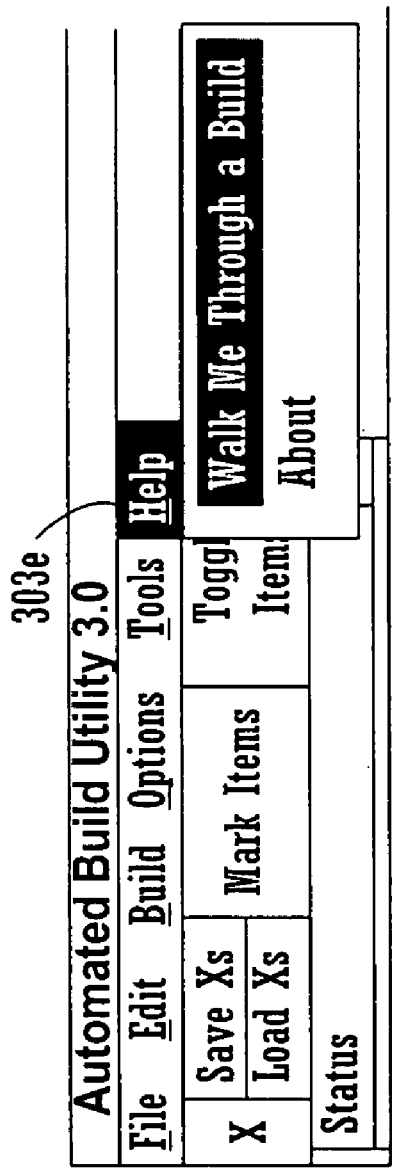
FIG. 3P is a graphical illustration of a help menu window configured according to one embodiment of the present invention.

FIG. 3P is a graphical illustration of a help menu 303F window configured according to one embodiment of the present invention. Functions that may be included on the help menu 303F include but are not limited to help functions such as "walk me through a build" and "about".

Image type select 310 facilitates a selection of a desired image type to be installed. Image types that may be selected include base images and full images. According to on embodiment, a base image is a subset of the full image. According to such embodiments the base image may consist of a program package that includes an operating system and its drivers. In other embodiments other base image packages may be employed. A full image is a complete image that is derived from the installation of all of the installation files identified by the ABU (e.g., 101) as corresponding to it.

User options section 311 (see FIG. 3) facilitates the selection of such user options as are described herein. These optional settings include but are not limited to version conflict alert 311A, logging type 311B (e.g., simple or advanced), registry tracking 311C (e.g., log registry changes), cleanups 311D (e.g., before and after) and pauses 311E.

Figure 4:
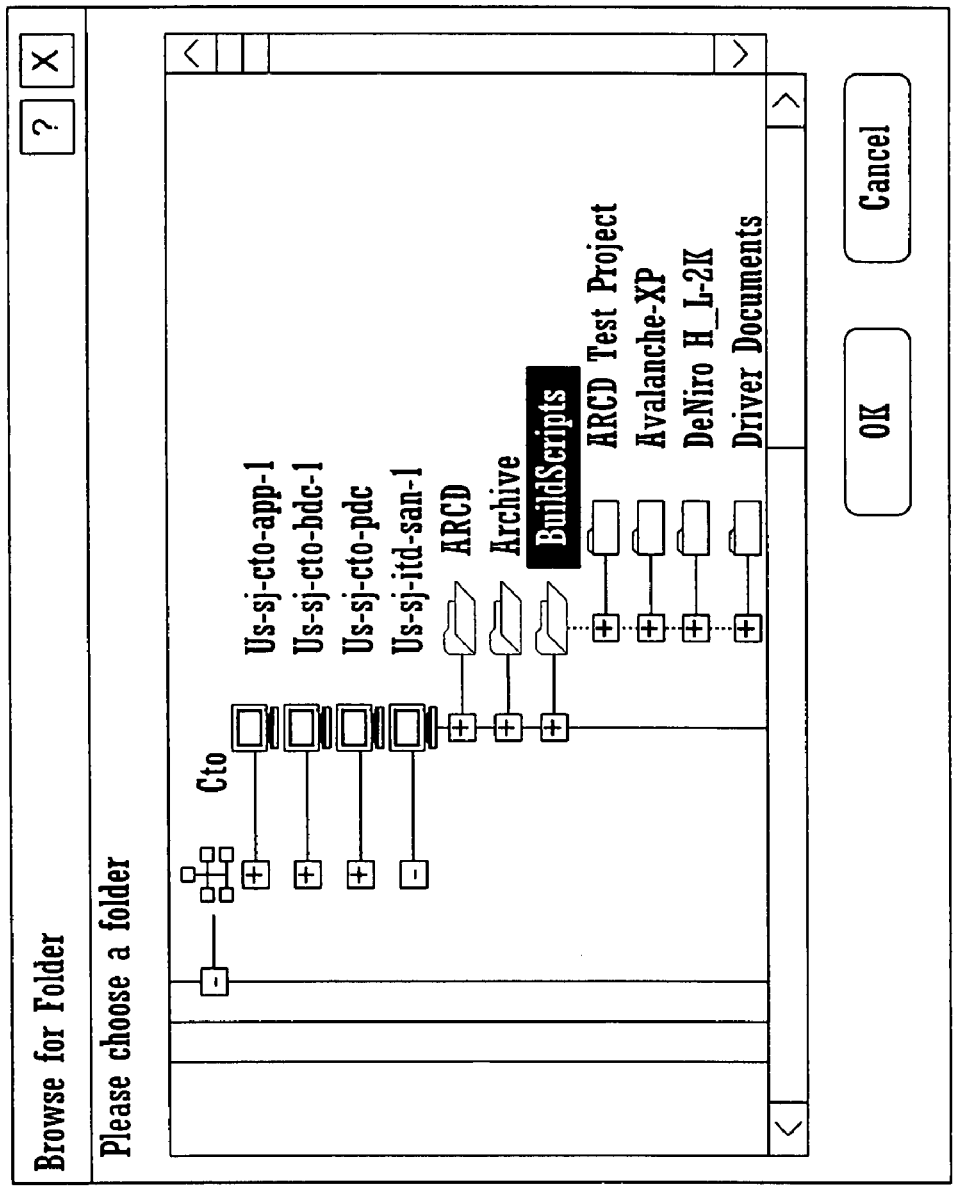
FIG. 4 shows a graphical user interface (GUI) that facilitates the browsing of network folders for OEM Pre-Install Kit (OPK) files, or Build Script files, according to one embodiment of the present invention.

FIG. 4 shows a graphical user interface (GUI) 400 that facilitates the browsing of network folders for OEM Pre-Install Kit (OPK) files according to one embodiment of the present invention. This GUI may be employed to browse network folders for OEM Pre-Install Kit (OPK) files. It should be appreciated that base OEM Pre-install Kit (OPK) files may be copied from the network to a specific project location (e.g., a specific PC etc.) on the network. According to one embodiment, ABU configuration files such as for example, "winbom.ini" and "unattend.txt" may be altered to reflect settings (which reflect the project version) in the current project. Project specific OPK drivers, quick fix engineering (QFE) releases and Most Frequently Used (MFU), links can also be added to the configuration set. All these tasks are outlined in an ABU script file. According to one embodiment the file may be designated "opkscript.ini" and is generated by a script generator (e.g., ScriptGen etc.) located in the database (e.g., VSMS etc.). In other embodiments other file designations may be employed. The OPK creation feature may contain no main application GUI window, but may provide sub windows that solicit needed input and pop-ups for information output.

Figure 5A:
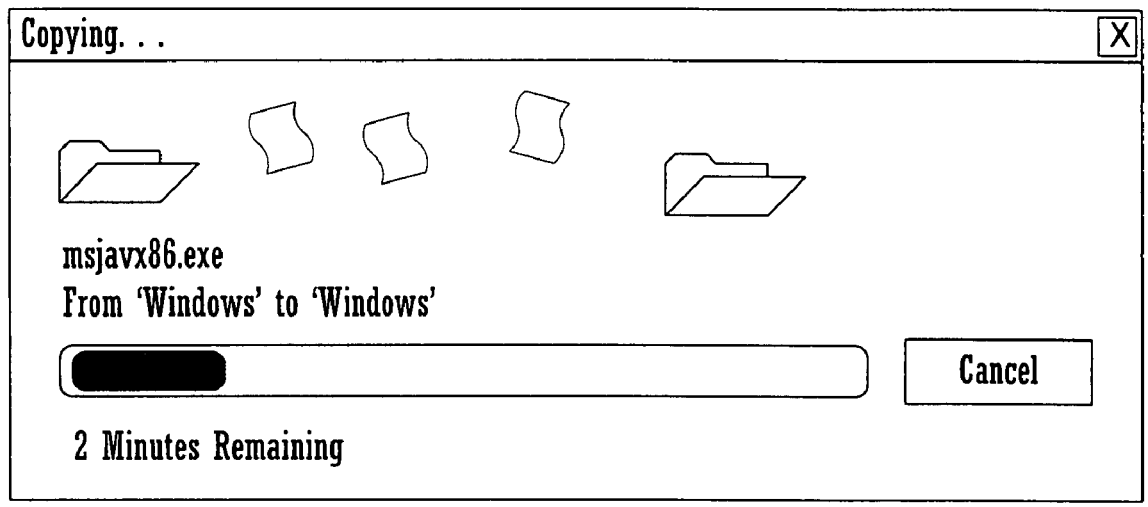
FIG. 5A is a window that tracks the file copying process according to one embodiment of the present invention.
Figure 5B:
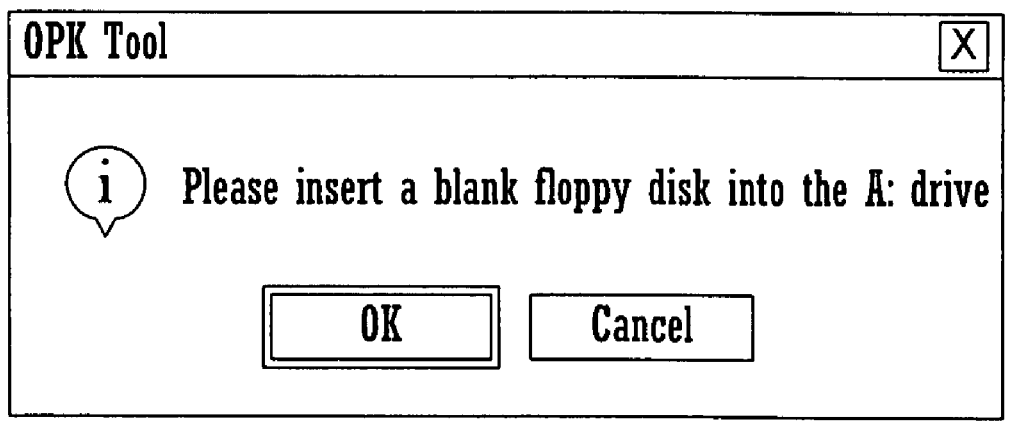
FIG. 5B is a window that requests that a user insert a floppy disk in order to store files to be copied according to one embodiment of the present invention.
Figure 5C:
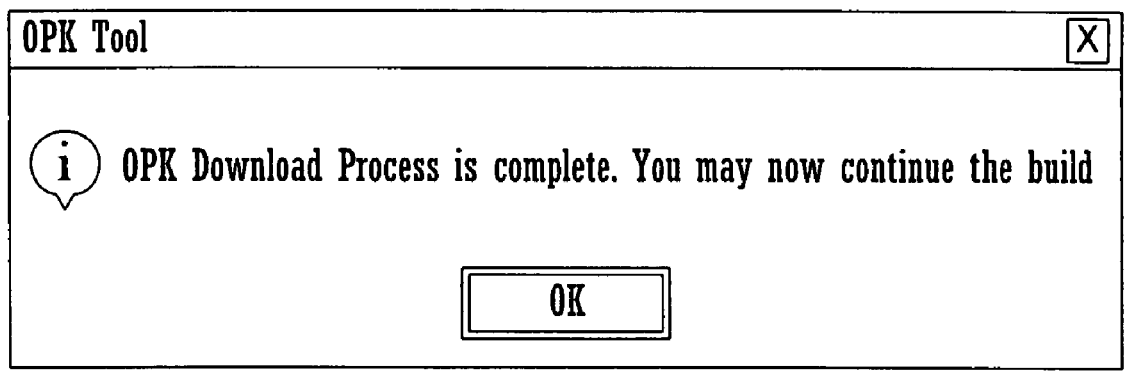
FIG. 5C is a window that indicates that the OPK file copying process is complete according to one embodiment of the present invention.

FIG. 5A-5C shows the windows and dialog boxes presented to a system user during the OPK creation process according to one embodiment of the present invention. FIG. 5A is a window 500A that tracks the file copying process according to one embodiment of the present invention. FIG. 5B is a window 500B that displays a request that a user insert a removable disk in order to store files to be copied according to one embodiment of the present invention. FIG. 5C is a window 500C that indicates that the file copying process is complete according to one embodiment of the present invention.

Cleanup Generation and Execution

Figure 6A:
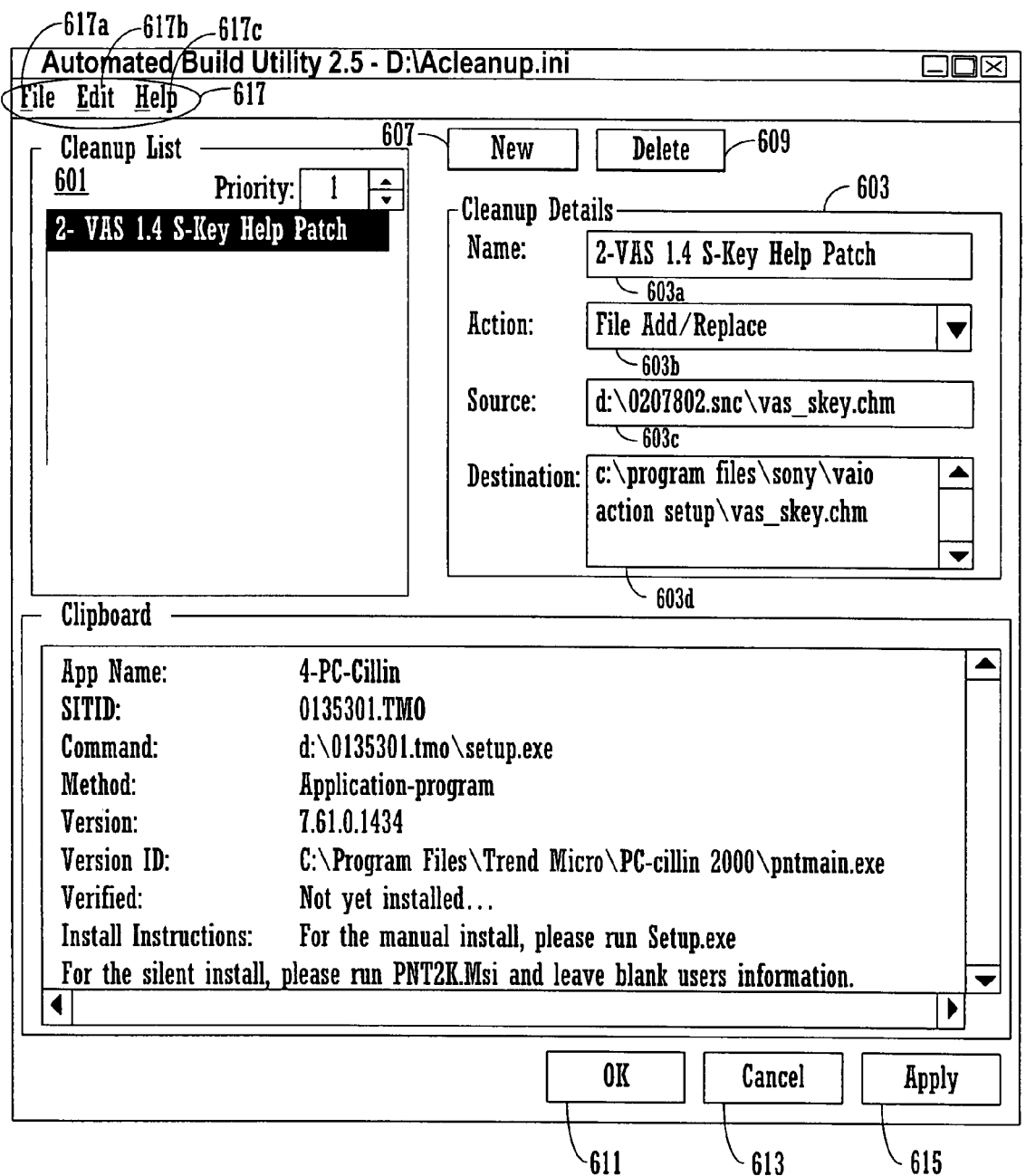
FIG. 6A shows cleanup GUI interface according to one embodiment of the present invention.

FIG. 6A shows cleanup GUI interface 600A according to one embodiment of the present invention. The cleanup generation and execution feature facilitates the creating, editing and executing of cleanup scripts at or near the completion of the installation process, in one embodiment. It should be appreciated that cleanup scripts are used to make changes to the image build that were not already present or completed by program installation execution operations. It provides a way to automate and keep track of manual steps and to make other necessary changes to the image build. These changes may later be included in the build scripts. There are two basic types of cleanups, cleanups that are set to occur before program installation execution and cleanups that are set to occur after program installation execution. According to one embodiment, each of these cleanup types may occur each time an application is run within ABU 101. It should be appreciated that cleanups may be run in a custom fashion irrespective of whether an application is executed.

Cleanup GUI interface 600A may include windows "Cleanup List" 601, "Cleanup Details" 603 (including "Name" 603A, "Action" 603B, "Source" 603C, and "Destination" 603E) and "ClipBoard" 605. In addition, Cleanup GUI interface may include button functions "New" 607, "Delete" 609, "OK" 611, "Cancel" 613, and "Apply" 615. Moreover, GUI interface 600A may include file 617A, edit 617B and help 617C menus 617.

According to one embodiment of the present invention, in order for the ABU to recognize a cleanup file it should be saved in an "INI" format with either the ".ini" or ".cln" file name extension. It should be appreciated that before cleanups may be saved to an ABU\before directory while after cleanups may be saved to an ABU\after directory. Custom cleanups not intended to be run either before or after program execution can be saved to any location.

Figure 6B:
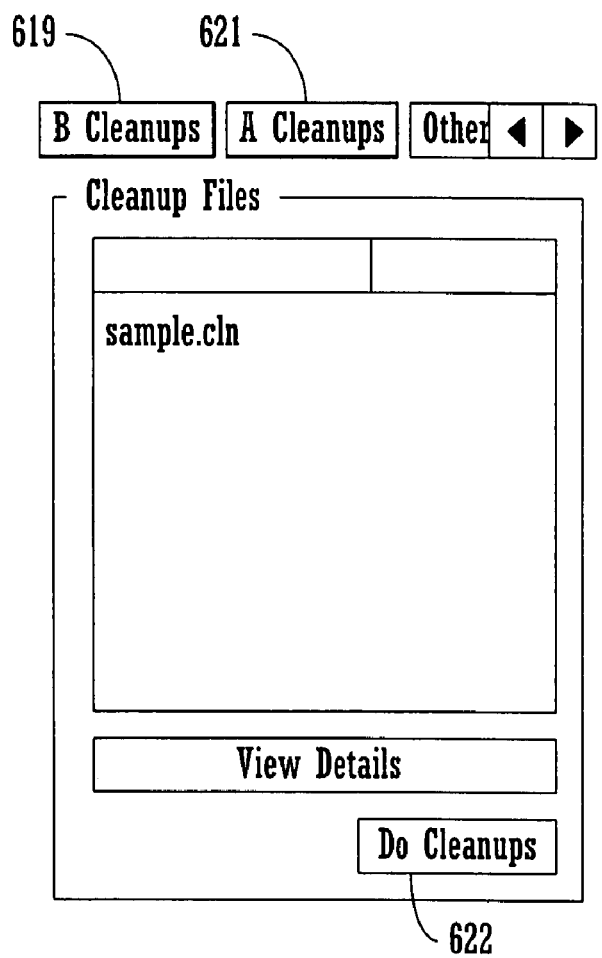
FIG. 6B shows a before cleanup list window that is available from the main GUI according to one embodiment of the present invention.

FIG. 6B shows a before cleanup list window 600B that is available from the main GUI according to one embodiment of the present invention. Available cleanup files are listed in the options menu 303D window of the main GUI. Any ".cin" or ".ini" files that are located in the before and after cleanup directories may be listed in the B 619 and A 621 cleanups lists respectively (see FIG. 6B). Each item from the lists may be selected and viewed with view details. Selecting a file opens the file and displays its contents within a cleanup Ini generator. In addition, the execution of selected cleanup files may be effected by selecting the "Do Cleanups" button function 622 shown in FIG. 6B.

Figure 6C:
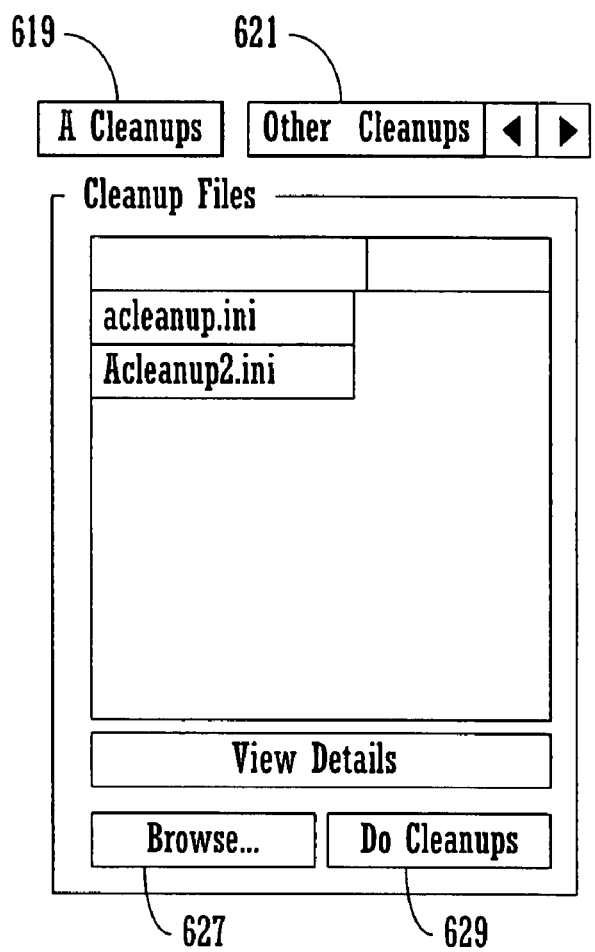
FIG. 6C shows a custom cleanup file management GUI that displays files located in a custom directory according to one embodiment of the present invention.

FIG. 6C shows a custom cleanup file management GUI 600C that displays files located in a custom directory according to one embodiment of the present invention. It should be appreciated that cleanup files may be saved to such a custom directory and may be listed in the "Other Cleanups" list 625. This may be accomplished by utilizing the "Browse" button function 627 to designate the custom directory selected to accommodate the cleanup files. As above the execution of selected cleanup files may be effected by selecting the "Do Cleanups" button function 629 shown in FIG. 6C. As with before and after cleanups discussed above, any cleanup files located within the designated directory may be displayed within a cleanup Ini generator.

Exemplary Operations in Accordance with Embodiments of the Present Invention

Figure 7:
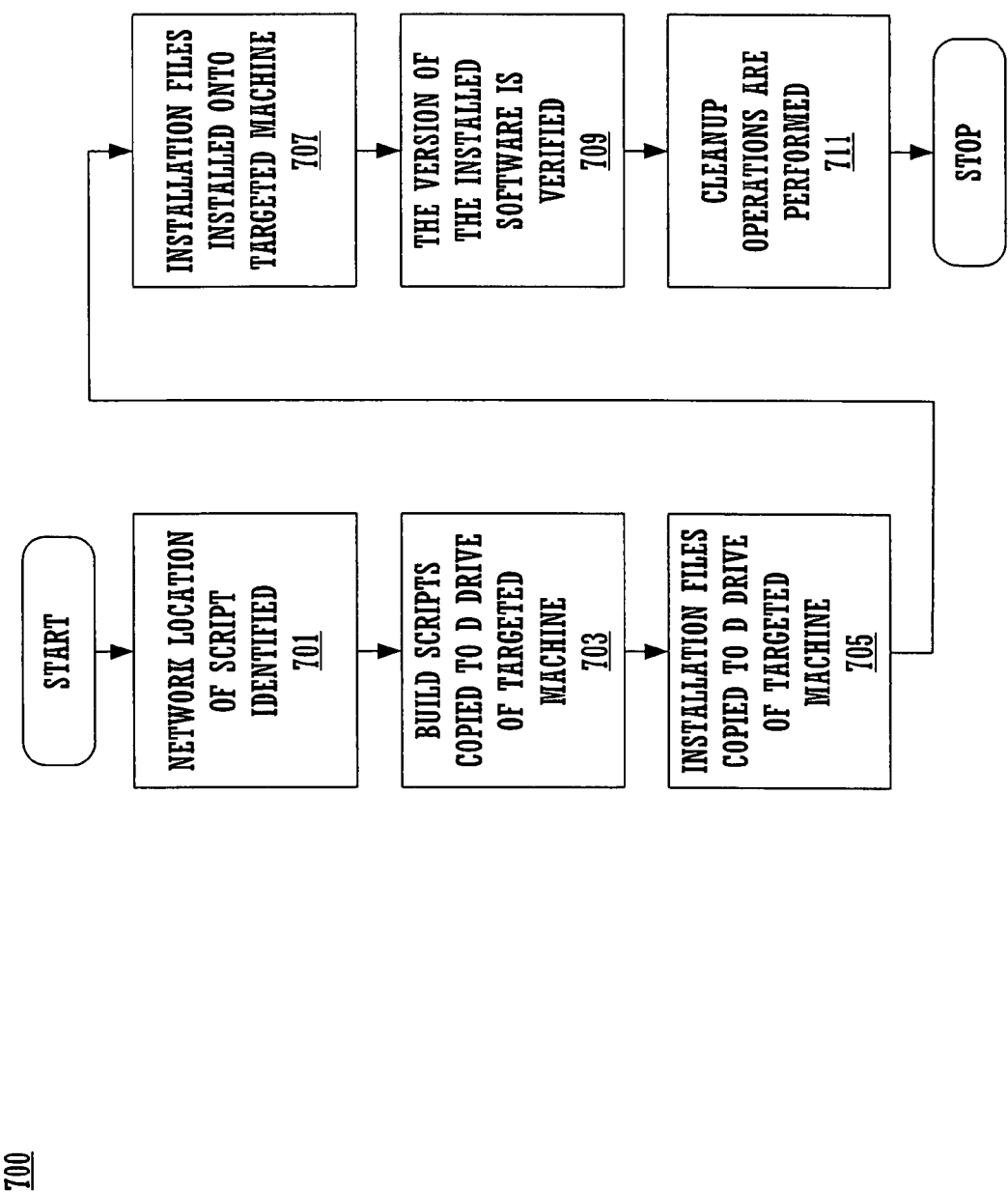
FIG. 7 shows a flowchart of the steps performed in the automated creation of image builds according to one embodiment of the present invention.

FIG. 7 shows a flowchart 700 of the steps performed in processes of the present invention which, in one embodiment, are carried out by processors and electrical components under the control of computer readable and computer executable instructions. The computer readable and computer executable instructions reside, for example, in data storage such as memory units 804 and 806 (see FIG. 8). However, the computer readable and computer executable instructions may reside in other types of computer readable medium. Although specific steps are disclosed in the flowcharts, such steps are exemplary. That is, the present invention is well suited to performing various other steps or variations of the steps recited in the flowcharts. Within the present embodiment, it should be appreciated that the steps of the flowcharts may be performed by software, by hardware or by a combination of both.

FIG. 7 shows a flowchart 700 of the steps performed in the automated creation of image builds according to one embodiment of the present invention.

At step 701, the network location of the build scripts is specified. According to one embodiment, the database 103 stores build scripts that are generated by script generator that resides therein. These build scripts may be accessed by the ABU 101 for use in the build creation process.

At step 703, the build scripts residing at the location specified in step 701 are copied to a targeted machine. In one embodiment the memory is a disk drive. This operation may be facilitated by using the copy build scripts to D button function 313 on ABU GUI 300. Copy build scripts to D button function 313 (see FIG. 3A) is a graphically rendered button function (e.g., icon) whose activation triggers the copying of build scripts that are provided by the database. The build scripts provide a blueprint from which a build may be created by the ABU. As described above, the script identifies a set of programs to be installed on the target device and the ordering of such installation and identifies any auxiliary or support programs that may be necessary to perform a software installation.

At step 705, installation files or program source corresponding to the build scripts copied to the drive of the targeted machine in step 703 are copied from the database to the drive of the targeted machine. This operation may be facilitated by using the copy installation files button function 315. The copy installation files button function 315 (see FIG. 3A) is a graphically rendered button function (e.g., icon) whose selection triggers the copying of installation files. The installation files that are copied are selected from the group of installation files that are listed in the installation file status window. The installation files are selected based on the image build that is being created. As previously discussed the selected files may represent "base plus" or "full image" items or both.

At step 707, the installation files are automatically installed onto the target machine (e.g., PC etc.) by following the instructions in the identified scripts as applied to the loaded software. The installation may be facilitated through the use of the execute installation button function 317. Execute installation button function 317 is a graphically rendered button (e.g., icon) whose selection triggers the installation of the installation files that have been copied. As the files are individually installed in sequence, window 301A is updated to reflect status information, etc.

At step 709, the version of the installed software is verified. Each program may be verified individually. This may be facilitated through the use of the version verification button function 319. The version verification button function 319 is a graphically rendered button function whose activation triggers the ABU (e.g., 101) verification of a program that has been installed. It should be appreciated that version verification can be an important operation in the tracking of software that has already been installed.

At step 711, cleanup operations are performed. The generation and execution of cleanup scripts may be facilitated through the use of cleanup GUI 600A. The cleanup generation and execution feature facilitates the creating, editing and executing of cleanup scripts. It should be appreciated that cleanup scripts may be used to make changes to the image build that were not already present or completed by program installation execution operations. At the completion of process 700, an image build is generated that corresponds to the Installation of the software identified in the script.

Exemplary Hardware in Accordance with Embodiments of the Present Invention

Figure 8:
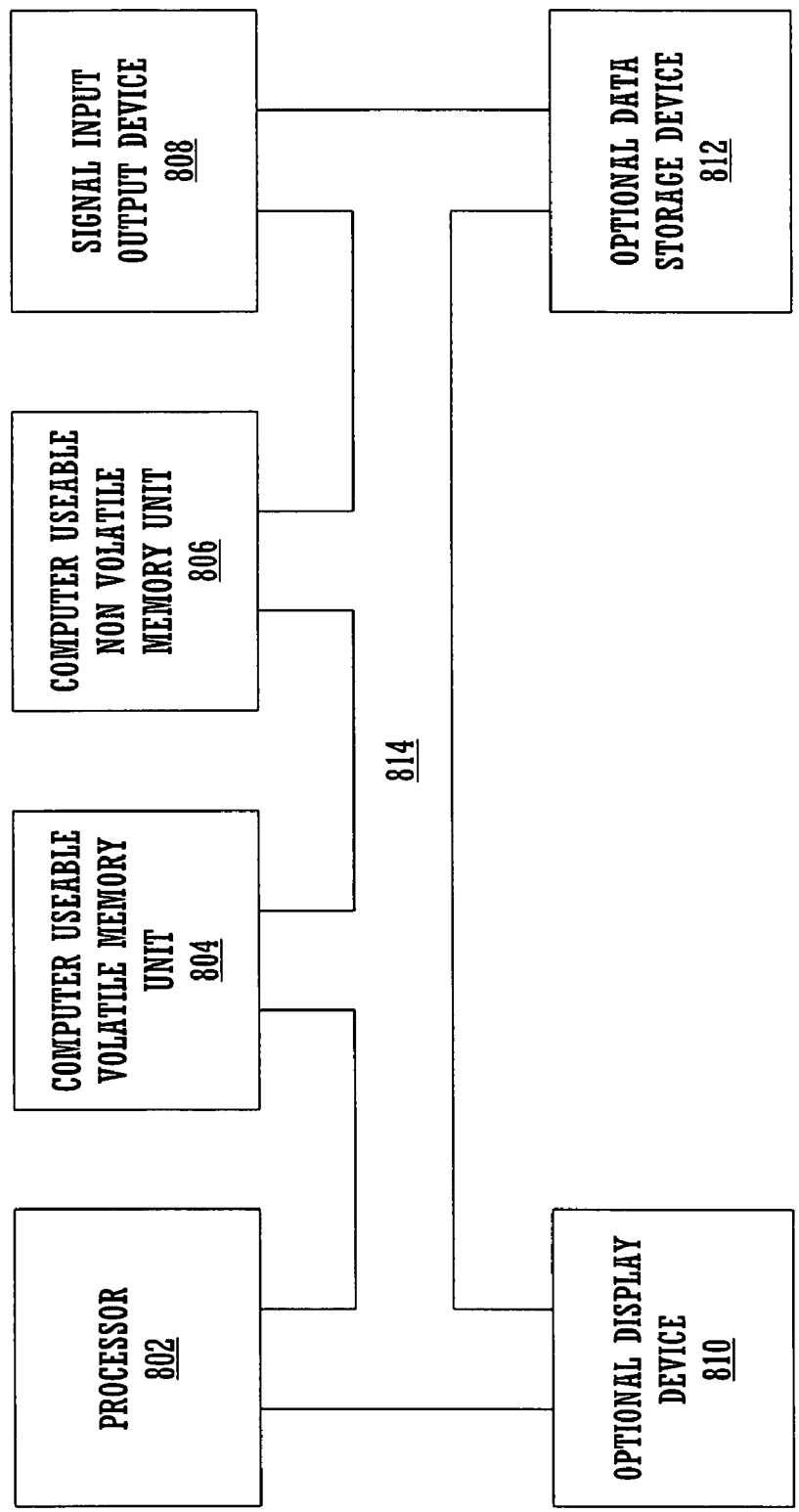
FIG. 8 is a block diagram of an exemplary computer system in accordance with embodiments of the present invention.

FIG. 8 is a block diagram of an exemplary computer system 800 in accordance with embodiments of the present invention. It should be appreciated that system 800 is not strictly limited to be a computer system. As such, system 800 may be well suited to be any type of computing device (e.g., server computer, embedded computing device, etc.). Within the following discussions herein, certain processes and steps are discussed that are realized, in some embodiments, as a series of instructions (e.g., software program) that reside within computer readable memory units of computer system 800 and executed by a processor(s) of system 800. When executed, the instructions cause computer 800 to perform specific actions and exhibit specific behavior which is described in detail below. According to one embodiment, the instructions may include code that when executed perform the steps in the flowchart discussed herein with reference to FIG. 7. It should be appreciated that according to one embodiment these instructions may be resident in the ABU 101. In other embodiments these instructions may be resident in other network devices.

Computer system 800 of FIG. 8 comprises an address/data bus 814 for communicating information, one or more central processors 802 coupled with bus 814 for processing information and instructions. Central processor unit 802 may be a microprocessor or any other type of processor. The computer 800 also includes data storage features such as a computer usable volatile memory unit 804 (e.g., random access memory, static RAM, dynamic RAM, etc.) coupled with bus 814 for storing information and instructions for central processor(s) 802, a computer usable non-volatile memory unit 806 (e.g., read only memory, programmable ROM, flash memory, EPROM, EEPROM, etc.) coupled with bus 814 for storing static information and instructions for processor(s) 802. System 800 also includes one or more signal generating and receiving devices 808 coupled with bus 814 for enabling system 800 to interface with other electronic devices. The communication interface(s) 808 of the present embodiment may include wired and/or wireless communication technology. For example, in some embodiments, the communication interface 808 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 800 may also include a computer usable mass data storage device 812 such as a magnetic or optical disk and disk drive (e.g., hard drive or floppy diskette) coupled with bus 814 for storing information and instructions. An optional display device 810 may be coupled to bus 814 of system 800 for displaying video and/or graphics. It should be appreciated that optional display device 810 may be a cathode ray tube (CRT), flat panel liquid crystal display (LCD), field emission display (FED), plasma display, or any other display device suitable for displaying video and/or graphic images and alphanumeric characters recognizable to a user.

As noted above with reference to exemplary embodiments thereof, a method and system for automated provision of build images is disclosed. The method includes identifying the network location of build scripts that provide information regarding the installation of installation files and copying the build scripts from the location on the network to a memory, e.g., a disk drive of a target machine. In addition, the method includes copying installation files that correspond to the build scripts to the D drive of the target machine. The installation files are subsequently installed on the target machine to create the build image.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-transitory computer readable storage medium (CRSM) containing a graphical user interface comprising:
   a first graphical element displayable on a display device and for indicating a network location of a build script, wherein said build script provides information about installation of at least one program;
   a second graphical element displayable on said display device and for indicating at least one installation option for said installation of said at least one program, wherein said second graphical element enables a selection of said at least one installation option to be added to said build script;
   a third graphical element displayable on said display device and for initiating copying of said build script to a target computer;
   a fourth graphical element displayable on said display device and for initiating copying of said at least one program to said target computer;
   a fifth graphical element displayable on said display device and for initiating said installation of said at least one program on a said target computer system in accordance with said build script that included said selection of said at least one installation option, wherein said build script is augmented with clean-up scripts that automatically modify said at least one program on said target computer system that is initiated installed; and
   a sixth graphical element for initiating verification of version information of said at least one program.

2. The CRSM of claim 1, wherein said target computer system is a personal computer.

3. The CRSM of claim 1, wherein said build script is stored in a memory of said target computer system.

4. The CRSM of claim 1, wherein said at least one installation option is selected from a group consisting of a reboot of said target computer system and a pause.

5. The CRSM of claim 1 further comprising:
   a seventh graphical element for tracking a status of said installation.

6. The CRSM of claim 1, wherein said installation of said at least one program creates a build image, and wherein said graphical user interface further comprises:
   an eighth graphical element for indicating a type of build image for said installation.

7. The CRSM of claim 1, wherein said first and second graphical elements comprise at least one element selected from a group consisting of a drop-down menu, a user-modifiable field, a checkbox, and a window.

8. The CRSM of claim 1, wherein said fifth graphical element comprises a button.

9. A display device containing a graphical user interface controlled by a processor, the display device comprising:
   a first graphical element displayable on the display device and for indicating a network location of a build script, wherein said build script provides information about installation of at least one program;
   a second graphical element displayable on said display device and for indicating at least one installation option for said installation of said at least one program, wherein said second graphical element enables a selection of said at least one installation option to be added to said build script, and said at least one installation option is selected from a group consisting of a reboot of said target computer system and a pause;
   a third graphical element displayable on said display device and for initiating copying of said build script from said network location to a target computer;
   a fourth graphical element displayable on said display device and for initiating copying of said at least one program to said target computer; and
   a fifth graphical element displayable on said display device and for initiating said installation of said at least one program on said target computer system in accordance with said build script that included said selection of said at least one installation option, wherein said build script is augmented with clean-up scripts that automatically modify said at least one program on said target computer system that is initiated installed.

10. The display device of claim 9, wherein said build script is stored in a database.

11. The display device of claim 9, wherein said program is copied from a server to said target computer system.

12. The display device of claim 9, wherein said target computer system is a personal computer.

13. The display device of claim 9, wherein said build script is stored in a memory of said target computer system.

14. The display device of claim 9 further comprising:
   a sixth graphical element for initiating verification of version information of said at least one program.

15. The display device of claim 1 further comprising:
   a seventh graphical element for tracking a status selected from a group consisting of a status of said installation and a status of said verification.

16. The display device of claim 9, wherein said installation of said at least one program creates a build image, and wherein said graphical user interface further comprises:

an eighth graphical element for indicating a type of build image for said installation.

17. The display device of claim 9, wherein said first and second graphical elements comprise at least one element selected from a group consisting of a drop-down menu, a user-modifiable field, a checkbox, and a window.

18. The display device of claim 9, wherein at least one of said third, fourth, and fifth graphical elements comprises a button.

19. A system comprising:
   a processor;
   a memory coupled to said processor; and
   a graphical user interface comprising:
      a first graphical element for indicating a network location of a build script, wherein said build script provides information about installation of at least one program;
      a second graphical element for indicating at least one installation option for said installation of said at least one program, wherein said second graphical element enables a selection of said at least one installation option to be added to said build script;
      a third graphical element for initiating copying of said build script to a target computer;
      a fourth graphical element for initiating copying of said at least one program to said target computer;
      a fifth graphical element for initiating said installation of said at least one program on a target computer system in accordance with said build script that included said selection of said at least one installation option, wherein said build script is augmented with clean-up scripts that automatically modify said at least one program on said target computer system that is initiated installed; and
      wherein said installation of said at least one program creates a build image, and wherein said graphical user interface further comprises:
      a sixth graphical element for indicating a type of build image for said installation.

20. The system of claim 19 wherein said graphical user interface further comprises:
   a seven graphical element for initiating verification of version information of said at least one program.

21. The system of claim 19, wherein said target computer system is a personal computer.

22. The system of claim 19, wherein said build script is stored in a memory of said target computer system.

23. The system of claim 19, wherein said at least one installation option is selected from a group consisting of a reboot of said target computer system and a pause.

24. The system of claim 19 wherein said graphical user interface further comprises:
   an eighth graphical element for tracking a status of said installation.

* * * * *